(12) United States Patent
Schmidt et al.

(10) Patent No.: US 7,192,072 B2
(45) Date of Patent: Mar. 20, 2007

(54) MOVABLE PANEL ASSEMBLY

(75) Inventors: Robert M. Schmidt, Livonia, MI (US); James B. Wright, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 13 days.

(21) Appl. No.: 11/060,968

(22) Filed: Feb. 18, 2005

(65) Prior Publication Data

US 2006/0186686 A1 Aug. 24, 2006

(51) Int. Cl.
*B62D 25/14* (2006.01)
*B60R 7/06* (2006.01)

(52) U.S. Cl. ..................... 296/37.12; 49/386
(58) Field of Classification Search ............. 296/24.34, 296/37.12, 70; 49/386, 387
See application file for complete search history.

(56) References Cited

U.S. PATENT DOCUMENTS

| | | | |
|---|---|---|---|
| 4,087,126 A | | 5/1978 | Wynn |
| 4,470,220 A | * | 9/1984 | Sudo ............................ 49/379 |
| 4,725,089 A | * | 2/1988 | Langer .................... 296/37.12 |
| 4,786,098 A | * | 11/1988 | Jobmann et al. ......... 296/37.12 |
| 5,207,471 A | | 5/1993 | Mutschler et al. |
| 5,275,456 A | * | 1/1994 | Ishii et al. ............... 296/37.12 |
| 5,639,002 A | * | 6/1997 | Weitbrecht et al. ......... 224/539 |
| 5,887,930 A | * | 3/1999 | Klein ...................... 296/37.12 |
| 6,003,925 A | | 12/1999 | Litke et al. |
| 6,125,030 A | * | 9/2000 | Mola et al. .................. 361/681 |
| 6,176,534 B1 | | 1/2001 | Duncan |
| 6,213,533 B1 | * | 4/2001 | Widulle et al. .......... 296/37.12 |
| 6,295,883 B1 | * | 10/2001 | Tsukada et al. ............ 74/89.18 |
| 6,354,649 B1 | | 3/2002 | Lee |
| 6,629,716 B2 | * | 10/2003 | Shibata et al. ................. 296/70 |
| 6,666,492 B1 | | 12/2003 | Schmidt et al. |
| 6,709,041 B1 | | 3/2004 | Hotary et al. |
| 6,746,067 B2 | | 6/2004 | Schmidt et al. |
| 6,799,785 B1 | * | 10/2004 | Davis, Jr. ................ 296/37.12 |
| 6,857,675 B2 | * | 2/2005 | Hayashi et al. |
| 7,021,728 B2 | * | 4/2006 | Donovan et al. ............. 312/7.2 |
| 2004/0189035 A1 | * | 9/2004 | Kurachi et al. .......... 296/37.12 |

FOREIGN PATENT DOCUMENTS

| | | |
|---|---|---|
| DE | 36 28 555 A1 | 2/1988 |
| DE | 199 23 414 C1 | 11/2000 |
| DE | 20 2004 017 601 U1 | 2/2005 |
| GB | 2 404 962 A | 12/2005 |
| GB | 2 414 779 A | 12/2005 |

\* cited by examiner

*Primary Examiner*—D. Glenn Dayoan
*Assistant Examiner*—Paul Chenevert
(74) *Attorney, Agent, or Firm*—MacMillan, Sobanski & Todd, LLC

(57) ABSTRACT

A movable panel assembly for a vehicle includes a housing adapted to be mounted within the interior of a vehicle. A panel is pivotably mounted to the housing about an axis. The panel is pivotably movable between a closed position and an open position through a vertical position. A spring member is operatively connected to the panel and biases the panel to move from the closed position to the vertical position. A damper is operatively connected to the panel for selectively retarding movement of the panel toward the open position.

17 Claims, 3 Drawing Sheets

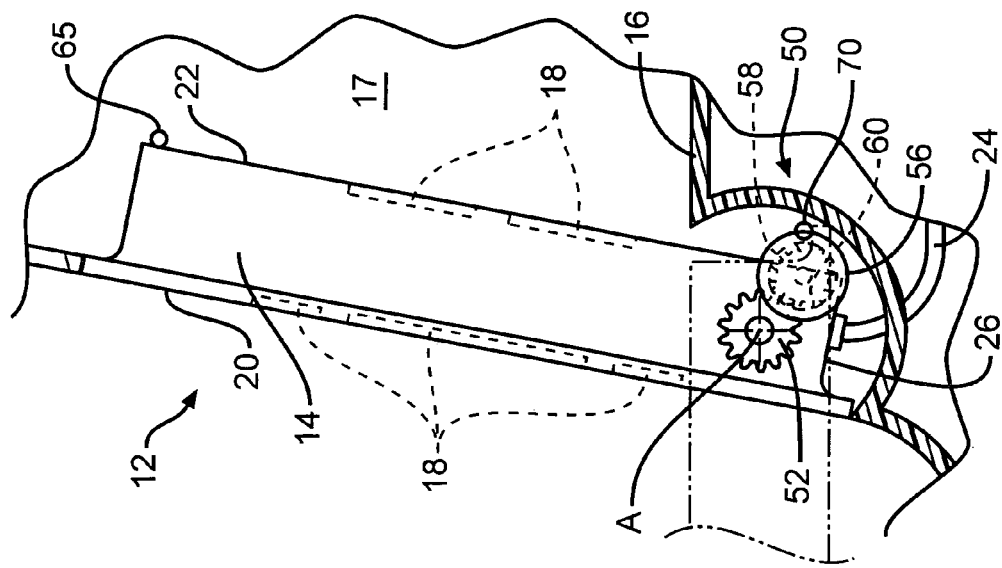
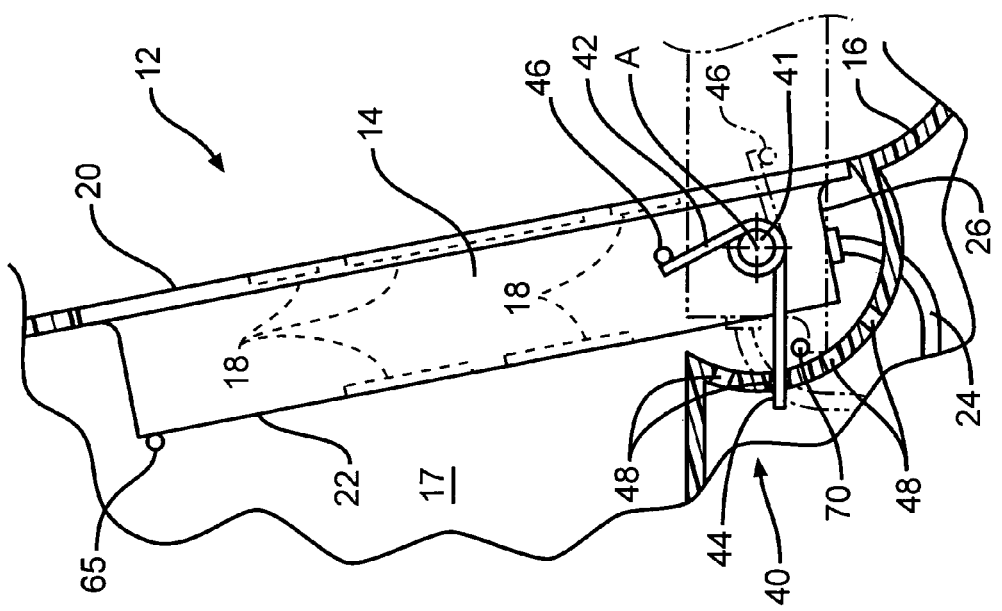

MOVABLE PANEL ASSEMBLY

BACKGROUND OF THE INVENTION

This invention relates in general to movable panels and, more specifically, to vehicle movable panels having spring members and dampers for controlling the movement of the panel.

Movable panels are increasingly common in vehicle panel assemblies, such as instrument panels for housing and concealing controls for the climate control, audio, video, or global positioning systems of a vehicle. Movable panels are generally movable to an open position to reveal additional controls or screens for controlling or monitoring a vehicle system. The movable panel may have components, such as controls and/or displays, mounted thereon for use when the movable panel is in either or both of the open position and a closed position. To connect the components mounted on the movable panel to the desired systems of the vehicle, the movable panel may have a flat flexible cable extending from a side of the movable panel facing away from the interior passenger compartment of the vehicle.

For movable panels which are relatively heavy due to components mounted thereon, it is especially challenging to control the movement of the movable panel between the open and closed positions. It is desirable that the panel moves relatively quickly, but should not slam down with great force or bounce when the panel has reached its outer positions. It is also desirable that only a small force be required to move the panel between the open and closed positions, however, the weight of a relatively heavy panel hinders such a design. It is also desirable that the speed at which the panel is moving from the closed position to the open position is relatively steady.

BRIEF SUMMARY OF THE INVENTION

This invention relates to a movable panel assembly for a vehicle. The movable panel assembly includes a housing adapted to be mounted within the interior of a vehicle. A panel is pivotably mounted to the housing about an axis. The panel is pivotably movable between a closed position and an open position through a vertical position. A spring member is operatively connected to the panel and biases the panel to move from the closed position to the vertical position. A damper is operatively connected to the panel for selectively retarding movement of the panel toward the open position.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a cross-sectional side view of the movable panel assembly shown in FIGS. 1 and 2 in the closed position.

FIG. 4 is a cross-sectional view of the other side of the movable panel assembly shown in FIGS. 1 through 3 in the closed position.

DETAILED DESCRIPTION OF THE PREFERRED EMBODIMENT

Figure 1:
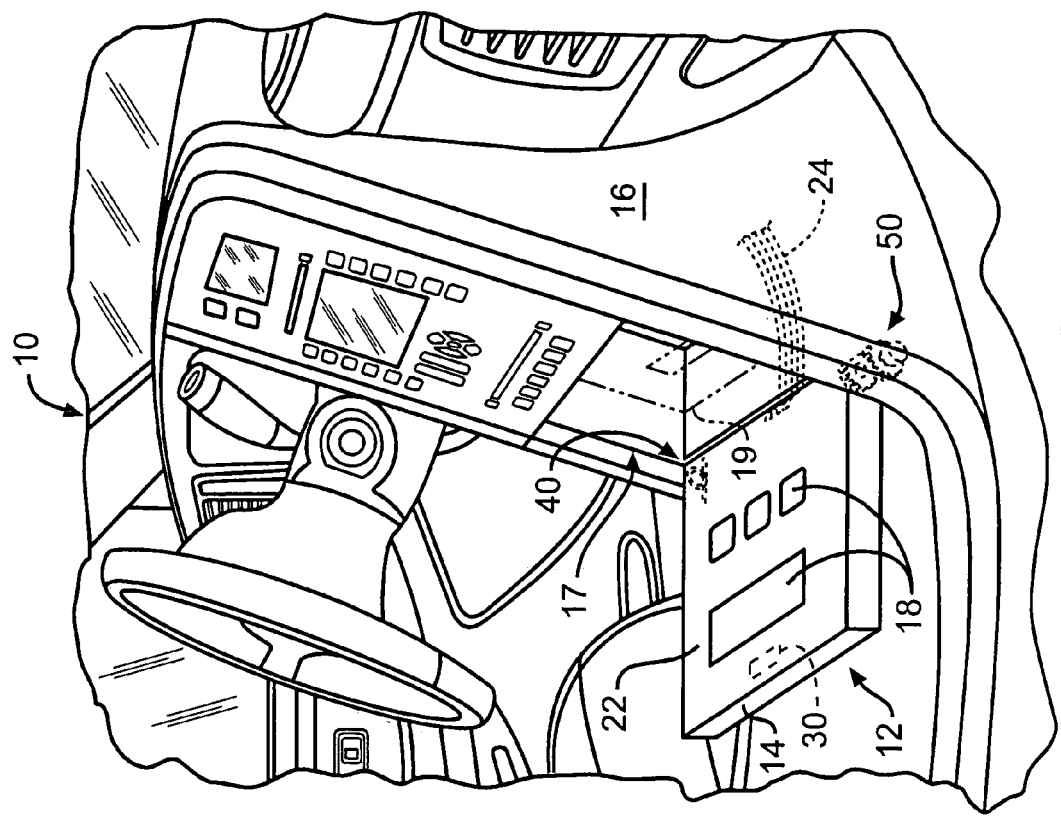
FIG. 1 is a perspective view of a movable panel assembly in a closed position in accordance with the present invention.
Figure 2:
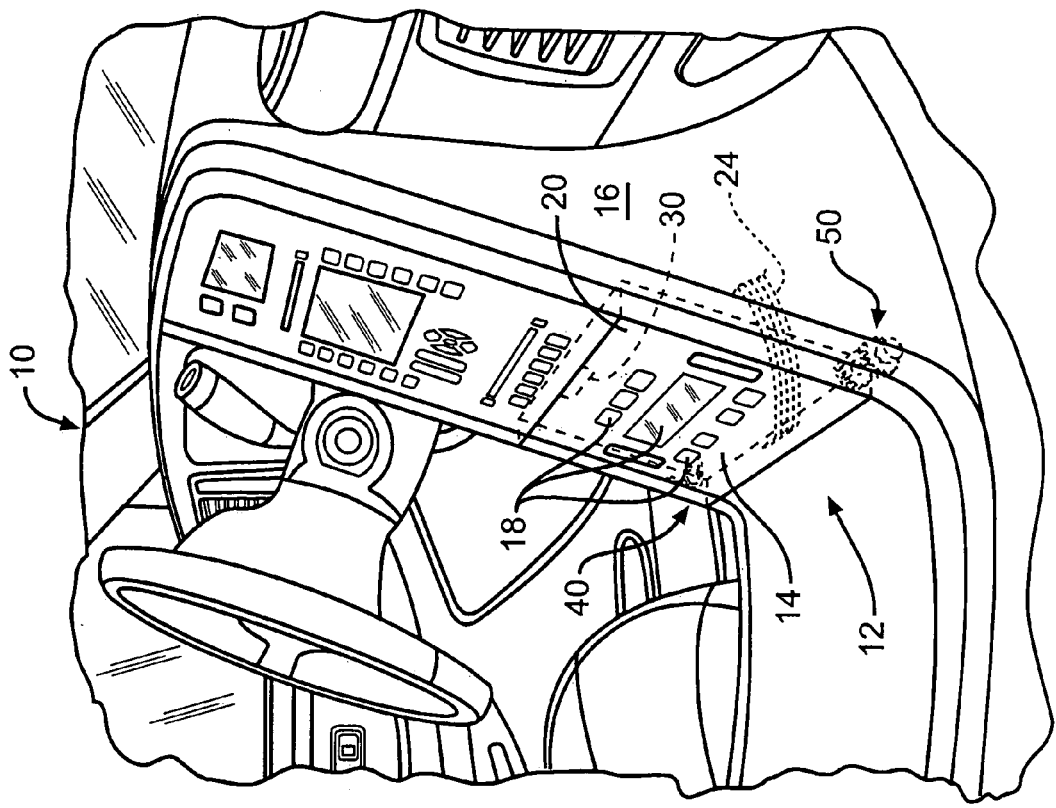
FIG. 2 is a perspective view of the movable panel assembly shown in FIG. 1 in an open position in accordance with the present invention.

Referring now to the drawings, there is illustrated in FIG. 1 a portion of an interior of a passenger compartment of a vehicle, indicated generally at 10. The interior includes a movable panel assembly, indicated generally at 12, in accordance with the present invention. The movable panel assembly 12 includes a panel 14 movably attached to a housing 16 in the vehicle 10. As illustrated in solid lines in FIG. 1, the panel 14 is in a closed position (schematically at 14*a* in FIG. 5) relative to the housing 16. The panel 14 is movable to an open (schematically at 14*b* in FIG. 5) generally horizontal position, as shown in FIG. 2. When in the open position, the panel 14 generally exposes the interior of a compartment 17.

In the exemplary embodiment illustrated, the housing 16 is a center stack panel of a vehicle. It will be appreciated however, that the housing 16 of the subject invention may be any desired vehicle panel, such as an instrument panel, rear console, seat back, and the like. The illustrated housing 16 is, in large measure, conventional in the art and is intended merely to illustrate one environment in which this invention may be used. Thus, the scope of this invention is not intended to be limited for use with the specific structure for the housing 16 illustrated in FIGS. 1 and 2. On the contrary, as will become apparent below, this invention may be used in any desired environment for the purposes described below.

The panel 14 is generally shown and described as a relatively flat rectangular panel, but it should be understood that the panel 14 in accordance with the present invention can have any suitable shape which is movable relative to the housing 16 between an open position and a closed position for generally covering the compartment 17. The panel 14 may include at least one electrical component 18 on a front face 20 of the panel 14 or on a back face 22, as shown in FIG. 2, that is accessible from an interior passenger compartment (not shown) when the movable panel assembly 12 is installed within a vehicle. The components 18 mounted on the front face 20 are accessible when the panel 14 is in its closed position, and the components 18 mounted on the rear face 22 are accessible when the panel is in its open position. The components 18 may be communicably connected by a flexible cable 24 extending from the panel 14 that is generally hidden from view from the interior passenger compartment when the movable panel assembly 12 is installed within a vehicle. The flexible cable 24 may connect the components 18 to at least one vehicle system (not shown).

The components 18 may be any electrical or electronic device, such as a switch or display device for any vehicle system. For example, the at least one component 18 may be an LCD screen for an audio system, a CD player for an audio system, and/or a switch for a climate control system. Thus, the panel 14 may be relatively heavy due to the relatively components mounted therein. For example, it is anticipated that the panel 14 may have a mass greater than 250 grams, and even greater than 500 grams. As will be described below, the movement of the panel 14 is desirably controlled even though the panel 14 is relatively heavy.

The flexible cable 24 may be any known flexible cable suitable for connecting the at least one component 18 to the at least one vehicle system (not shown). In a preferred embodiment, the flexible cable 24 is a flat flexible cable that is generally wider than it is thicker, although such is not required. In a preferred embodiment, the flexible cable 24 extends outwardly from the movable panel 14 about an edge portion 26, so that the flexible cable 24 is not visible from the interior passenger compartment of the vehicle regardless of the position of the movable panel 14, as will be described herein.

As stated above, the panel 14 generally conceals the interior of the compartment 17 when in its closed position. The compartment 17 may be simply a storage compartment for the storage of various items. Alternatively, the compartment 17 may house a component or components, indicated schematically at 19 in FIG. 2, mounted therein such that access to the components and/or its controls is available when the panel 14 is in its open position, but otherwise is out of view when the panel 14 is in its closed position. For example, the component 19 may be similar to the components 18 described above, such as any electrical or electronic device, switch or display device for any vehicle system.

In a preferred embodiment, the panel 14 is pivotably mounted to the housing 16 about an axis A. The axis A may extend through a portion of the movable panel 14, such that the lower portion of the panel 14 forms an axle portion about the axis A. Preferably, the axis A is horizontally oriented.

The movable panel 14 is movable from the closed position, shown in FIG. 1, to an open position relative to the housing 16, as illustrated in FIG. 2. In the open position, the compartment 17 of the housing 16 is revealed by the panel 14, such that the compartment 17 is visible and/or accessible from the interior passenger compartment when the movable panel assembly 12 is installed within a vehicle. It will be appreciated that the flexible cable 24 remains connected to the at least one component 18 and the vehicle system (not shown) regardless of the position of the panel 14 relative to the housing 16. It will also be appreciated that the panel 14 may be movable to a plurality of positions relative to the housing 16 in which varying portions of the compartment 17 of the housing 16 may be concealed or exposed by the panel 14.

Preferably, the panel 14 includes a latch mechanism, indicated schematically at 30 in FIGS. 1 and 2, to selectively maintain the panel 14 in its closed position relative to the housing 16. The latch mechanism 30 can be any suitable latch which is operable by the user to release the panel 14 from its closed position so that the panel 14 may then be moved to its open position.

Preferably, the panel 14 is spring biased towards its open position so that when the latch 30 is operated, the panel 14 automatically moves to its open position. The panel 14 may be spring biased by any suitable spring mechanism, such as by the spring 40 illustrated in FIG. 3. In the embodiment shown, the spring 40 is located on the left side of the panel 14 and connected between the panel 14 and the housing 16. More specifically, the spring 40 is a coil spring having a pair of ends 42 and 44. The spring 40 may be housed about a generally cylindrical extension 41 formed on the edge of the panel 14. Note that the extension 41 is co-axially aligned with the axis A about which the panel 14 is rotated. The end 42 of the spring 40 is fixed relative to the panel 14 such as by a stop 46. The stop 46 may be an outwardly extending projection formed on the edge of the panel 14. The end 42 of the spring 40 may be connected to the stop 46 or may simply abut the stop 46 such that the spring force biases the end 42 against the stop 46. The other end 44 of the spring 40 is operatively fixed relative to the housing 16. In the embodiment shown in FIG. 3, the end 44 of the spring 40 is disposed in one of a plurality of slots 48 formed in the housing 16. The plurality of slots 48 are provided such that the spring force exerted on the panel 14 may be altered by adjusting the angle of the end 44 of the spring 40 relative to its coiled portion by positioning the end 44 in a different slot 48. Thus, the spring force acting on the panel 14 is adjustable. Of course, the spring 40 (or any other spring member) may be adjustably mounted by any suitable manner.

It is also preferred that the panel 14 is movably mounted such that motion of the panel when moved to its open position is damped or retarded to slow the rotationally velocity of the panel 14. This damped motion is preferred so that the panel 14 does not slam down with great force against the housing 16. Also, it is desired such that the panel 14 does not bounce once contact is made with the housing 16. These disadvantages may be reduced or eliminated by adding a damper assembly, indicated schematically at 50 in FIG. 4.

In the embodiment shown, the damper assembly 50 is located on the right side of the panel 14 and is operatively connected between the panel 14 and the housing 16. Any suitable damper mechanism may be used for the damper assembly 50. In the embodiment shown, the damper assembly 50 includes a gear 52 connected to the edge of the panel 14. The gear 52 is fixed relative to the panel 14. The gear 52 includes a plurality or gear teeth arranged in a circular or arcuate path about the axis A. The damper assembly 50 also includes a housing 56 having a generally cylindrical recess 58. The housing 56 is fixed relative to the housing 16. A gear 60 is rotatably disposed in the cylindrical recess 58 defining a cavity. The gear 60 includes a plurality of gear teeth in mesh with the gear teeth of the gear 52. Preferably, the diameter of the gear 60 is only slightly smaller than the diameter of the cylindrical recess 58 so that the tips of the gear teeth of the gear 60 are spaced close to the sides of the cylindrical walls of the recess 58. The gear 60 is free to rotate with the recess 58. A fluid of a desired viscosity is disposed in the cavity defined by the recess 58. When the panel 14 is rotated about axis A, the gear 52 also rotates relative to the axis A. Rotational movement of the gear 52 will cause the gear 60 to rotate in the cavity defined by the recess 58. As the gear 60 rotates within the cavity, the fluid within the cavity hinders or retards the rotation of the gear 60, such as by fluid shear, thereby damping the movement of the panel 14.

In the embodiment of the movable panel assembly 12 illustrated in FIGS. 1 through 4, the panel assembly includes the spring 40 generally mounted on one side of the panel 14 and the damper assembly 50 mounted on the other side. Although any suitable mounting arrangement may be used, the illustrated mounting arrangement is preferred to minimize the mounting space required. It should be understood, that this invention is not limited to such an arrangement. Also, the panel 14 and/or the housing 16 may include features such as recesses or protrusions for accommodating the spring 40 and damper assembly 50.

The operation of the panel 14 will now be described in detail. As shown schematically in FIG. 5, the panel 14 is movable between a closed position 14a and an open position 14b. As will be explained below, the panel 14 is also movable in a generally vertical position 14c and an intermediate position 14d when moved between the closed and open positions.

Figure 5:
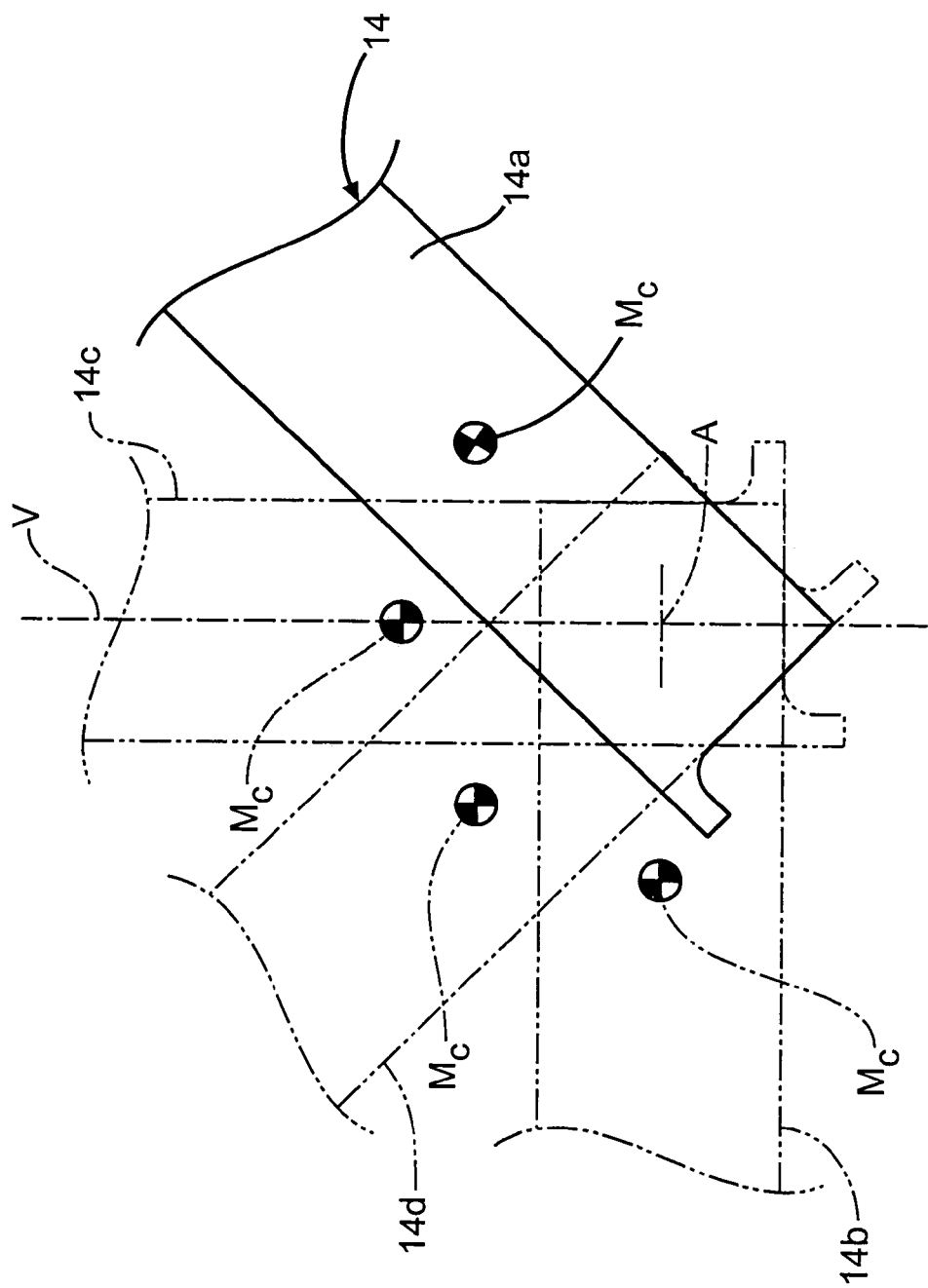
FIG. 5 is a schematic cross-sectional side view of the movable panel assembly shown in FIGS. 1 through 4, illustrated in the closed, vertical, intermediate, and open positions.

In its closed position, the latch mechanism 30 maintains the panel 14 in its closed position. The panel assembly 12 may include a stop 65 formed in the housing 16 to properly locate the panel 14 relative to the housing 16 in a generally flush manner. To move the panel 14 to its closed position, the user operates the latch mechanism 30 to release the panel 14. Once released, the force from the spring 40 will cause the panel 14 to rotate about the axis A in a counter-clockwise direction as viewing FIG. 5. The panel 14 will rotate in the counter-clockwise direction to the generally vertical position 14c. During the movement between the closed position 14a and the vertical position 14c, the spring force overcomes the gravitational force to generally move the panel 14 upward, as shown by the vertical displacement of the center of mass Mc of the panel 14 from the closed position to the vertical position. Note that the center of mass Mc of the panel 14 when in its vertical position 14c is aligned with a vertical axis V. The center of mass Mc may be located equidistant from the faces 20 and 22 of the panel, as shown in FIG. 5, or may be offset such that the panel will be slightly offset from the vertical axis V. Further rotational movement in the counter-clockwise direction, caused by the force of the spring 40, will move the panel 14 to any number of intermediate positions 14d between the vertical position 14c and the open position 14b. When in these intermediate positions, gravity assists in lowering the panel 14 to its open position 14b. The panel assembly 12 may include a stop 70 fixed relative to the housing 16, as shown in FIGS. 3 and 4, to prevent further movement of the panel 14 once in its open position.

The spring 40 may be configured such that the spring force is continuously acting against the panel 14 during its entire motion from the closed position 14a to the open position 14b. Thus, the spring force assists the panel 14 during its entire rotational movement. When returning the panel 14 from its open position 14b to the closed position 14a, the user pushes the panel 14 against the force of the spring 40. The spring 40 will also assist in maintaining the panel 14 in its open position so that during movement of the vehicle the panel 14 will not inadvertently rise upward. The damper assembly 50 also helps in assisting maintaining the panel from lifting upward.

Alternatively, the spring 40 may be configured such that the spring force only acts on the panel 14 during its positions between the closed position 14a and the generally vertical position 14c. In this situation, the spring force overcomes the effect of gravity against opening the panel 14a, but does not assist gravity between the vertical position 14c and the open position 14b. Thus, the panel 14 is automatically moved by the spring 40 in its initial movement and then once beyond the vertical position 14c, gravity automatically moves the panel to its open position 14b. The spring may also be configured such that the spring force still acts against the panel 14 positions. This assures that the panel 14 has sufficient velocity to overcome the damper assembly 50 and any frictional forces so that the gravity will then assist in moving the panel downward. This alternative spring arrangement helps to prevent the panel 14 from slamming against the housing 16 or stop 17 when it moves to its open position 14b.

During movement of the panel 14 from its closed position 14a to its open position 14b the damper assembly 50 will retard the rotational motion of the panel 14, thereby slowing the rotational velocity of the panel 14. The damper assembly 50 may be configured such that the damper assembly retards the movement of the panel 14 between all positions and both rotational directions. Thus, when manually moved from its open position to the closed position, the damper assembly 50 will also retard this movement. To prevent such retardation, the damper assembly 50 may be configured to be a one-way damper such that damping only occurs during counter-clockwise direction, and not in the clockwise direction when the panel 14 is lifted from its open position 14b to its closed position 14a. The panel 14 will be free from significant retardation, with the exclusion of frictional forces or slight forces in the one-way damper assembly. To provide this one-way damping, the damper assembly 50 could include a clutch mechanism (not shown) which prevents the gear 52 from rotating relative to the panel 14 during its clockwise rotation. However, the clutch engages the gear 52 when the panel is moved in the counter-clockwise direction so that the gear 60 is also rotated. Of course, the damper assembly 50 can be any mechanism having one-way damping properties.

Additionally or alternatively, the damper assembly 50 could be configured such that damping is selectively provided during counter-clockwise rotation. For example, the damper assembly 50 may only provide damping during the later stages of the panel 14 moving to its open position, such that damping occurs between an intermediate position 14d and the open position 14b. This can be accomplished by limiting the arcuate length of the gear teeth of the gear 52 so that the gears 52 and 60 will mesh only during this angle of rotation.

In another alternate embodiment, the damper assembly 50 provides different forces depending upon the position of the panel 14. For example, two or more damping assemblies 50 may be used which engage at different stages relative to the position of the panel 14.

The invention as described above, is ideally suited for a panel 14 which is relatively heavy, such as for example a panel having a mass greater than 250 grams or even greater than 500 grams. Excessive spring force will cause a relatively heavy panel 14 to slam into the housing 16 or the stop 70, and excessive damping to compensate for this large spring force is undesirable due to the force required to lift the panel 14 to its closed position. This is particularly true for relatively heavy panels 14 since the effect of gravity is much larger than a relatively light panel, such as a conventional sunglass holder or ashtray lid. This is even more particularly true if the center of mass of the panel 14 is significantly above the axis A of the panel's rotation, as is shown in FIG. 5.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A movable panel assembly for a vehicle comprising:
   a housing adapted to be mounted within the interior of a vehicle;
   a panel mounted on the housing for pivoting movement about an axis between a closed position and an open position through a vertical position;
   a spring member connected to the panel and biasing the panel to move from the closed position to the vertical position; and
   a damper connected to the panel for constantly retarding movement of the panel from the vertical position to the open position.

2. The movable panel assembly of claim 1, wherein the spring member biases the panel to move from the closed position to the open position.

3. The movable panel assembly of claim 1, wherein the spring member biases the panel when the panel is in the open position to help prevent undesirable movement of the panel towards the closed position.

4. The movable panel assembly of claim 1, wherein the damper constantly retards the movement of the panel from the closed position to the open position.

5. The movable panel assembly of claim 1, wherein the panel moves to an intermediate position between the vertical position and the open position, and wherein the damper retards the movement of the panel from the intermediate position to the open position, and wherein the panel is free from significant retardation of movement induced by the damper between the closed position and the intermediate position.

6. The movable panel assembly of claim 1, wherein the panel is free from significant retardation of movement induced by the damper as the panel moves toward the closed position.

7. The movable panel assembly of claim 1, wherein the panel is free from significant biasing by the spring member as the panel retracts or moves toward the closed position.

8. The movable panel assembly of claim 1, wherein the spring member is a coil spring.

9. The movable panel assembly of claim 1, wherein the damper is a one-way rotary damper.

10. The movable panel assembly of claim 1, wherein the panel has a mass of greater than approximately 250 grams.

11. The movable panel assembly of claim 1, wherein the panel has a mass of greater than or equal to approximately 500 grams.

12. The movable panel assembly of claim 1, further including a latch mechanism adapted to retain the panel in the closed position until actuated to release the panel.

13. The movable panel assembly of claim 1, wherein the center of mass of the panel is significantly above the axis in the closed position and the center of mass of the panel is above the axis when the panel is in the vertical position.

14. The movable panel assembly of claim 1, wherein the damper is adapted to selectively retard the movement of the panel by applying a force on the panel that varies depending on the position of the panel relative to the housing.

15. The movable panel assembly of claim 1, wherein the spring is adapted to selectively bias the panel by applying a force on the panel that varies depending on the position of the panel relative to the housing.

16. The movable panel assembly of claim 1, wherein the panel includes an extension disposed along the axis at a lower portion of the panel, and wherein the spring member is disposed at an end of the extension between the panel and the housing.

17. The movable panel assembly of claim 1, wherein the damper is located axially between the panel and the housing.

* * * * *